Sept. 16, 1969     T. W. TECHLER ET AL     3,467,022

ASPIRATOR CONTROL APPARATUS

Original Filed Sept. 8, 1965     2 Sheets-Sheet 1

INVENTOR.
THOMAS W. TECHLER
RICHARD G. THOMPSON
BY

ATTORNEYS

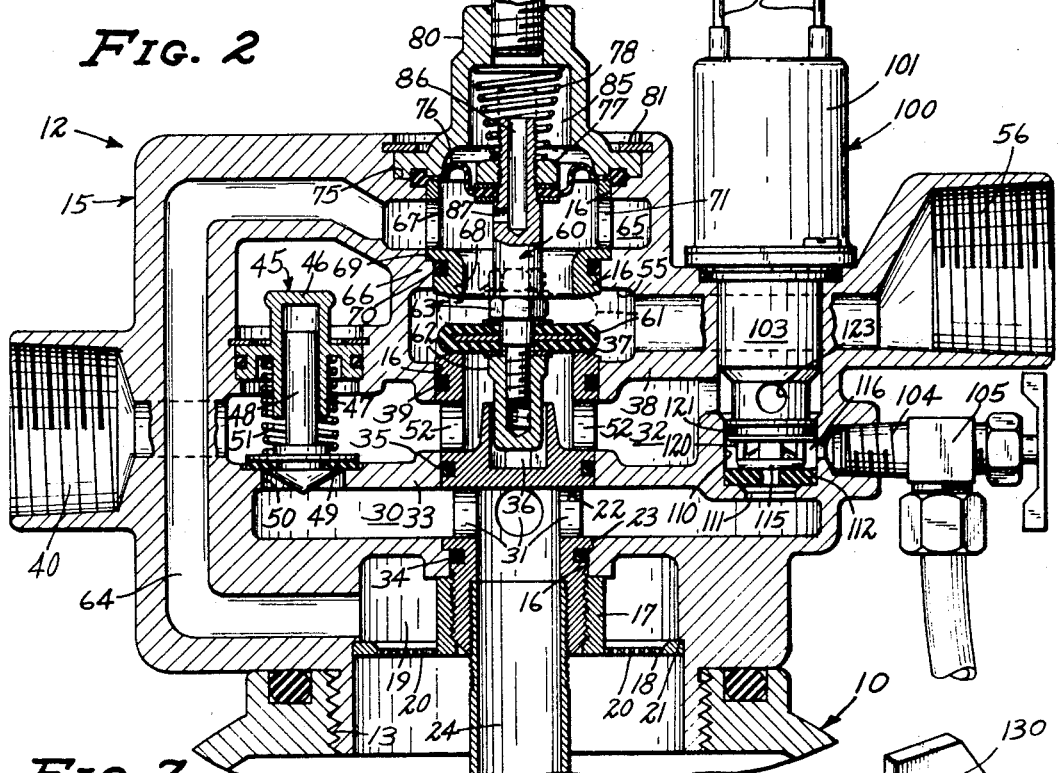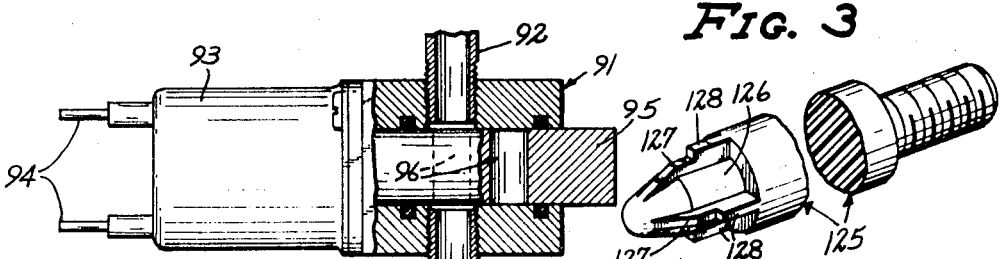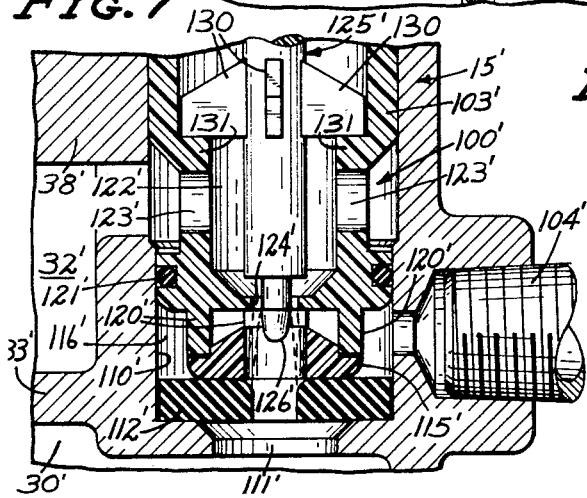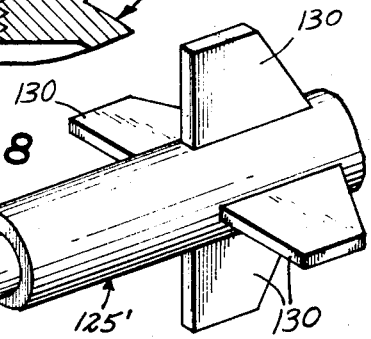

United States Patent Office 3,467,022
Patented Sept. 16, 1969

3,467,022
ASPIRATOR CONTROL APPARATUS
Thomas W. Techler and Richard G. Thompson, St. Paul, Minn., assignors to L. & A. Products, Inc., St. Paul, Minn.
Continuation of application Ser. No. 485,826, Sept. 8, 1965. This application Mar. 1, 1968, Ser. No. 709,837
Int. Cl. B01d 29/38, 29/00
U.S. Cl. 103—272            4 Claims

ABSTRACT OF THE DISCLOSURE

Apparatus for controlling the flow of water through a softening system including an aspirator with a passageway therethrough having an area with a reduced cross-section and a longitudinally movable plunger positioned in the area so that the water flowing therethrough is restricted to a high velocity, low volume stream having a generally annual cross-section when the plunger is in a first position, and a substantially solid cylinder of water is allowed to pass through the area when the plunger is in a second position. A brine supply is in communication with the passageway below the restricted area, and the high velocity stream of water produces an aspirating effect which draws in the brine solution and mixes it with the water to provide a regenerative solution for the softening tank. The solid or increased volume of water is utilized to clean the aspirator as well as to flush the regenerating solution from the softening tank.

---

This application is a continuation to application Ser. No. 485,826, filed Sept. 8, 1965, now abandoned.

This invention pertains to a new and improved apparatus for water softeners and the like, and more particularly to an aspirator having a movable part which produces a Venturi effect in one position thereby drawing brine or some other regenerating fluid into the stream and which provides an unrestricted passageway for a high volume of water in a second position.

In the water softening field, water softeners for use in homes and the like generally consist of a mineral tank containing a mineral bed which reacts with hard water flowing therethrough in an ion exchange process to provide soft water at the outlet. At periodic intervals the minerals in the tank must be cycled through a regeneration process to rebuild the softening capacity thereof. In the regeneration process, a salt solution known as a brine is delivered to the outlet of the mineral tank and flows slowly backward therethrough to the inlet and out to a drain. As the brine flows through the mineral bed, another ion exchange process takes place in which sodium ions replace the hardness ions in the mineral which were previously taken out of the water. After a given period of time, the brine solution is stopped and a fast-rinse cycle in which plain water is circulated backward through the mineral tank for a relatively short period of time is initiated. This fast-rinse cycle rinses any remaining brine from the mineral tank and expands the mineral bed slightly in preparation for the next softening period.

In prior art water softening apparatus a system of valves is utilized to allow the hard water to flow through the mineral bed during the service or softening position from the inlet to the outlet, which is connected to the soft water system of the house. During regeneration the valves divert the hard water through an aspirator, which produces a Venturi effect, drawing in brine solution that mixes with the hard water and circulates through the mineral tank from the outlet to the inlet, which is connected to a drain. After the regeneration cycle, a fast-rinse cycle is initiated by diverting the hard water through a by-pass, which is connected directly to the outlet of the mineral tank, and the inlet of the mineral tank remains connected to the drain. The valve system in this apparatus is very complicated in the construction and the operation thereof.

In the present invention, an aspirator having a moving part therein is utilized. The moving part of the aspirator has two positions, in the first position a stream of water flowing through the aspirator has low volume and high velocity and in the second position the stream of water has high volume and low velocity. When the moving part is in the first position, the high velocity stream of water flowing through a chamber in the aspirator creates a partial vacuum which draws brine into the chamber. The brine mixes with the stream of water to provide a solution for regeneration of the mineral tank. In the second position the stream of water having a high volume and low velocity, which is the normal flow of water throughout the system, produces a slight pressure on the brine line in the chamber of the aspirator and, therefore, pure hard water is delivered to the outlet of the mineral tank for the fast-rinse cycle.

In general, the moving part of the aspirator reduces the cross-section of a portion of the stream of water flowing through the aspirator to reduce the volume and increase the velocity in the first position while it allows an unrestricted flow in the second position. This reduction of the cross-section of the stream may be accomplished in a number of different fashions. For example, apparatus can be utilized to reduce the size of the inlet to the mixing chamber of the aspirator from its normal size, but retain the same general configuration, apparatus can be utilized to change the inlet from a circular cross-section to an annular cross-section, or apparatus can be utilized which changes the inlet from a circular cross-section to an annular cross-section composed of a plurality of arcuate sections. Each of these different embodiments is considered to be within the scope of this invention, as well as many other embodiments which might be produced by one skilled in the art.

The present invention has a number of advantages over the prior art, some of which include simplicity of construction and operation, cost, the saving in materials and size of the apparatus, and many other advantages which will become apparent upon a further reading of the specification. In addition, the present invention has the major advantage of being self-cleaning. That is, during the fast rinse cycle the high volume of water flowing through the aspirator washes away all of the brine solution in the mixing chamber and any impurities in the aspirator itself and greatly reduces any possibility of salt deposits or the like therein, which would eventually reduce efficiency.

It is an object of the present invention to provide a new and improved control apparatus for water softeners and the like.

It is a further object of the present invention to provide a new and improved aspirator for water softeners and the like.

It is a further object of the present invention to provide an aspirator having a first position in which brine is mixed with hard water to provide a regeneration solution and a second position in which hard water is provided in a large volume for a fast-rinse cycle in water softeners and the like.

It is a further object of the present invention to provide an aspirator which is self-cleaning.

It is a further object of the present invention to provide an aspirator which produces a hollow substantially cylindrical stream of hard water in a first position, which stream greatly increases the efficiency of the aspirator since a higher vacuum is produced in the mixing chamber with a smaller volume of hard water.

These and other objects of this invention will become apparent to those skilled in the art upon consideration of the accompanying specification, claims, and drawings.

Referring to the drawings, wherein like characters indicate like parts throughout the figures:

FIG. 2 is a semi-schematic view of the present control apparatus in which some parts thereof have been rotated into the plane of the view to more clearly illustrate the operation thereof;

FIG. 3 is an enlarged view in perspective of an aspirator core utilized to produce a hollow substantially cylindrical stream of water composed of a plurality of arcuate sections;

FIG. 7 is a view similar to FIG. 4 illustrating a different embodiment; and

FIG. 8 is an enlarged view in perspective of the modified core illustrated in FIG. 7.

Figure 1:
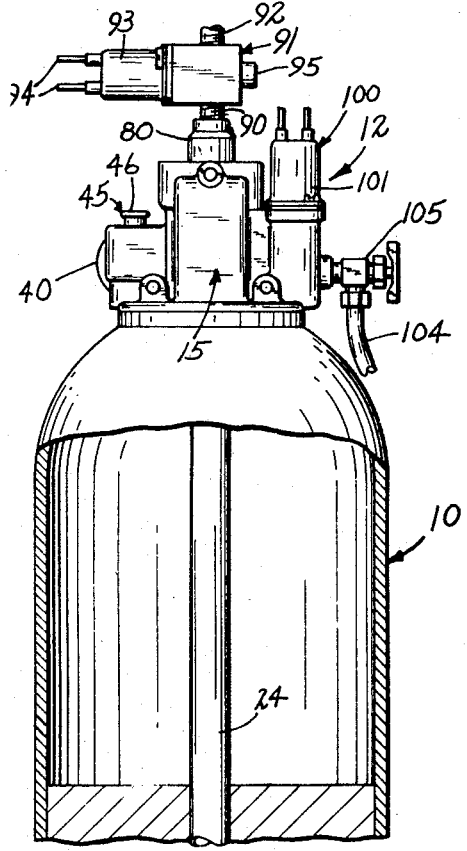
FIG. 1 is a view of a mineral tank with the present control apparatus attached thereto, parts thereof broken away and shown in section.

In FIG. 1, the numeral 10 designates a mineral tank partially filled with a mineral bed 11. Threadedly engaged at the top of the tank 10 is the present control apparatus which is generally designated 12. A semi-schematic, partially sectional view of the control apparatus 12 is illustrated in FIG. 2. Portions of the control apparatus have been rotated into the plane of the figure so that complete fluid paths are illustrated in FIG. 2 for simplicity of explanation. It should be understood that the exact location of the parts in the control apparatus 12 is not critical and many of the parts may be connected to the present apparatus in various ways to obtain the same results.

In FIG. 2 the numeral 15 designates a casting which acts as a housing for the control apparatus 12. The housing 15 is threadedly engaged with the tank 10 at 13, the upper end of the tank 10 being open and in communication with the inner passageways of the housing 15 as will be explained presently. The housing 15 has a centrally located opening 16 extending vertically upwardly therethrough. A hollow cylindrical member 17 having a flange 18, with a greatly increased diameter, around the lower edge thereof is positioned in an opening in the bottom of the housing 15 coaxial with the centrally located opening 16. The member 17 in conjunction with the housing 15 forms a substantially toroidal-shape chamber 19 in the bottom of the housing 15 and coaxial with the opening 16. The flange 18 of the member 17 has a plurality of substantially annular slots 20 therethrough so that the chamber 19 is in communication with the tank 10. The slots 20 are small enough to act as a filter to prevent mineral 11 from entering the control apparatus 12. The flange 18 of the member 17 rests on a shoulder 21 on the housing 15 which maintains the member 17 coaxial with respect to the opening 16 during assembly and the like. The inner surface of the member 17 is threaded for assembly purposes.

A somewhat cylindrical shaped member generally designated 22 fits into the opening 16 in housing 15 and the lower end thereof is threaded on the outer surface to mate with the threads in the member 17. The member 22 has a flange 23 extending around the circumference thereof, which is spaced a short distance from the lower threaded end. The flange 23 butts against a shoulder of the housing 15 to prevent the member 22 from sliding completely through the opening 16. When the member 22 is threadedly engaged with the member 17, the flange 23 and the flange 18 cooperate with the shoulders of the housing 15 to maintain both the members 22 and 17 fixedly in place. The lower end of the member 22 is also threaded internally and a riser pipe 24 which extends from substantially the bottom of the tank 10 is engaged therein. The riser pipe 24 has a screen 25 at the lower end thereof to prevent minerals in the mineral bed 11 from entering therein. In the service or normal operating position, hard water enters the top of the tank and soft water is drawn off through the riser pipe 24.

The housing 15 has a somewhat rectangular shaped chamber 30 immediately above the chamber 19, but not in communication therewith. The member 22 is hollow from the lower end thereof to the top of the chamber 30 and has a plurality of holes 31 therein which connect the chamber 30 with the riser pipe 24. A chamber 32 immediately above the chamber 30 in the housing 15 is separated from the chamber 30 by the member 22 cooperating with a partition 33 in the housing 15 therebetween. An O-ring 34 is positioned between the member 22 and the housing 15 adjacent the lower end thereof and acts as a seal to prevent fluid flow between the chamber 30 and the chamber 19. An O-ring 35 is positioned between the member 22 and the partition 33 of the housing 15 to prevent fluid flow between the chamber 32 and the chamber 30.

The member 22 and the partition 33 form a continuous wall between the chamber 30 and the chamber 32. A portion of the upper surface of the member 22 extends upwardly from this wall to form a substantially cylindrical opening 36 coaxial with the opening 16. The opening 36 has a hexagonal shaped cross-section so that a wrench may be inserted therein during assembly of the apparatus for tightening of the member 22 within the member 17. The member 22 extends upwardly in a hollow cylindrical configuration above the upper edges of the opening 36 to form a valve seat 37. The outer circumference of the upper end of the member 22 adjacent the valve seat 37 is in contact with a partition 38, which forms the upper surface of the chamber 32. A rubber O-ring 39 is positioned between the member 22 and the partition 38 to prevent fluid from flowing therebetween.

A soft water outlet 40, at the far left of the housing 15 in FIG. 2, is in communication with the chamber 32. A valve generally designated 45 has a body 46 which is fixedly attached in an opening in the partition 38 of housing 15 adjacent outlet 40. The body 46 of the valve 45 has a hollow cylindrical portion 47 extending downwardly toward the partition 33 in the housing 15. A shaft 48 is slidably engaged in the cylindrical portion 47 and has a self-centering valve element 49 at the lower end thereof. The valve element 49 cooperates with a seat in the partition 33 to close a hole 50 which extends through the partition 33 from the chamber 30 to the chamber 32. A cylindrical compression spring 51 which is positioned coaxial with the shaft 48 and the cylindrical portion 47 in the housing 46, fits snugly between the valve element 49 and the housing 46 to bias the valve element 49 in the normally closed position. When the fluid pressure in the chamber 30 becomes greater than the fluid pressure in the chamber 32, the valve element 49 is pushed upwardly against the bias of the spring 51 thereby opening the hole 50 through the partition 33 and allowing fluid to flow from the chamber 30 to the chamber 32.

A chamber 55 is formed in the housing 15 above the partition 38 and is in communication with a hard water inlet 56, at the far right of the housing in FIG. 2, which is adapted to be connected to a source of hard water. The member 22 has a plurality of holes 52 therein immediately below the valve seat 37, which holes 52 connect the chamber 32 with the inner opening of the member 22 at the upper end thereof. The upper end of the member 22, which forms the valve seat 37, opens into the chamber 55 and, therefore, the chamber 55 is in communication with the chamber 32 through the inner opening of the member 22.

An elongated shaft 60, which is positioned coaxially in the opening 16, has a bib washer 61 fixedly attached adjacent the lower end thereof. Bib washer 61 consists of a metal disk having a thick rubber coating thereover and a centrally located hole therethrough. The lower portion of the shaft 60 is somewhat reduced in diameter and has a threaded portion adjacent the end thereof. The bib washer 61 is placed on the shaft 60 against the shoulder, produced by the portion of the shaft which is reduced in diameter, and a nut 62 is threadedly engaged thereon to hold the bib washer 61 fixedly in place. Immediately above the bib washer 61 a portion 63 of the shaft 60 is formed into a hexagonal shape for the application of a wrench or the like in assembly. The bib washer 61 is positioned concentric with the opening 16 in the housing 15 and has a diameter slightly larger than the longitudinal opening in the upper end of the member 22. In the normal position the bib washer 61 rests on the valve seat 37 at the upper end of the member 22 and prevents the flow of fluid from the chamber 55 to the chamber 32.

A chamber 65 in the housing 15 is positioned directly above the chamber 55 and separated therefrom by a partition 66, except for the centrally located opening 16 which passes therethrough. The upper surface of the chamber 65 is defined by the upper wall of the housing 15 which also has the opening 16 extending therethrough. A passageway 64 extending substantially parallel to the top, right side and bottom, respectively, of the housing 15 connects the chamber 65 with the chamber 19 for fluid flow therebetween. A hollow substantially cylindrical member 67 having a valve seat 68, similar to valve seat 37, at the lower end thereof, is positioned in the opening 16 so the valve seat 68 forms a portion of the lower surface of the partition 66. The member 67 is formed with a portion of the lower end thereof having a reduced diameter, and the partition 66 has a shoulder 69 extending radially inwardly into the opening 16 to provide the member 67 with a stop. A rubber O-ring 70 is positioned between the member 67 and the partition 66 to prevent fluid from passing therebetween. The member 67 extends upwardly from the partition 66 a short distance into the opening 16 in the upper wall of the housing 15, but communication between the chamber 65 and the axial opening in the member 67 is provided by a plurality of holes 71 therein.

A portion of the opening 16 in the upper wall of the housing 15 adjacent the upper surface has a slightly increased diameter to form a shoulder 75. The upper surface of the shoulder 75 is approximately in a plane with the upper edge of the cylindrical member 67. A resilient substantially circular diaphragm 76 has a centrally located hole therethrough and is fixedly attached coaxially to the shaft 60 by means of a nut 77. The upper end of the shaft 60 is threaded to receive the nut 77 thereon. The nut 77 is threaded onto the upper end of the shaft 60 so that the outer edges of the diaphragm 76 rest on the shoulder 75. A substantially conical compression spring 78 is fitted over the shaft 60 and rests on the nut 77. The spring 78 extends upwardly beyond the end of the shaft 60 a substantial distance. A hollow cap 80 fits over the spring 78 and rests on the shoulder 75 of the housing 15, thereby holding the diaphragm 76 and the spring 78 firmly in place. A lock ring 81 fits into a groove in the upper wall of the housing 15 and holds the cap 80 fixedly in place. The outer edge of the diaphragm 76 is terminated in a type of O-ring configuration which serves to hold the diaphragm 76 tautly in place while acting as a seal to prevent the flow of fluid out of the housing 15.

The diaphragm 76 acts as a flexible partition which separates a portion of the previously described chamber 65 into a chamber 85 formed by the cap 80 and the upper surface of the diaphragm 76. The upper end of the shaft 60 has an axial hole 86 therein which extends well into the chamber 65 and is connected therewith by a radial hole 87 in the shaft 60. The holes 87 and 86 in the shaft 60 form a restricted passageway for fluid from the chamber 65 to the chamber 85. The chamber 85 is sufficiently large to allow vertical movement of the shaft 60 from a normal position in which the bib washer 61 rests on the valve seat 37 to a second position in which the bib washer 61 rests on the valve seat 68. The spring 78 biases the shaft 60 to its normal position.

The upper end of the cap 80 has one end of a short piece of pipe 90 threadedly engaged therein. The other end of the pipe 90 is attached to a solenoid valve generally designated 91. A piece of pipe 92 similar to the pipe 90 is attached to the other end of the solenoid valve 91 and is adapted to be connected to a drain, not shown. The solenoid valve 91 has a coil 93 adapted to be connected to a proper source of power by a pair of connections 94. The core 95 of the solenoid valve 91 is constructed of a piece of metal having a hole 96 passing transversely therethrough. When the coil 93 of the solenoid valve 91 is energized, the core 95 is moved to the left in FIG. 2 and the hole 96 is aligned with the pipes 90 and 92 allowing fluid to pass therethrough to the drain. The solenoid valve 91 is shown in the de-energized position in FIG. 2.

A solenoid operated aspirating mechanism generally designated 100 is fixedly attached to the partition 66 at the right side of the housing 15 in FIG. 2. The aspirating mechanism 100 has a solenoid 101 which is adapted to be energized by the connection of a proper power source to a pair of connections 102 at the upper end thereof. The lower end of the solenoid 101 is fixedly attached to the upper end of a housing 103. One end of a brine line 104 is connected to the housing 15 and in communication with an inner chamber in housing 103 as will be explained presently. The brine line 104 has a manually operable valve 105 cooperating therewith and the other end is connected to a source of brine, not shown, which is standard in the water softening art. The inner workings of the aspirating mechanism 100 will be explained in conjunction with FIGS. 3 through 8.

Figure 4:
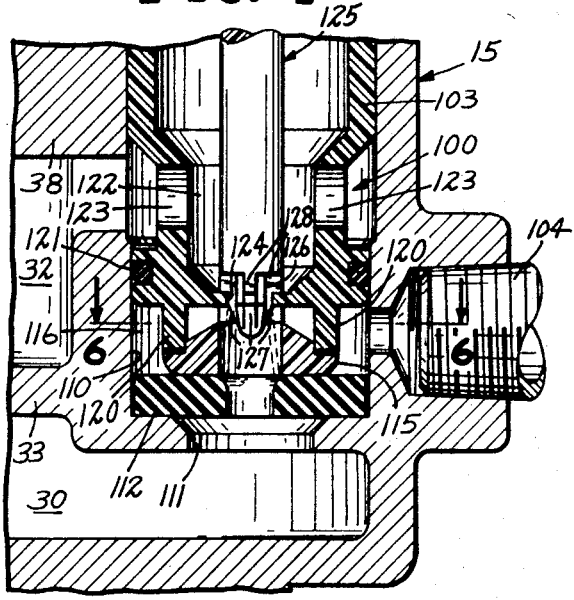
FIG. 4 is an enlarged axial sectional view of a portion of FIG. 2, showing the aspirator in detail.

Referring to FIG. 4, the partition 33 in conjunction with the right wall of the housing 15 forms a substantially cylindrical opening 110 which opens vertically upwardly into the chamber 32. The lower end of the cylindrical opening 110 is closed except for a hole 111 having a substantially reduced diameter. The upper edges of the hole 111 are tapered slightly outwardly so that the upper edge of the hole 111 has a substantially larger diameter than the lower edge of the hole 111. A flexible washer 112, which may be constructed of rubber or the like, having a centrally located hole therethrough is positioned at the bottom of the opening 110 and coaxial therewith so that the hole in the washer 112 is coaxial with the hole 111 but substantially smaller.

A throat 115, which is somewhat hemispherical in shape, has a centrally located hole therethrough having a slightly larger diameter than the hole through the washer 112 and is positioned on the upper surface of the washer 112 so the holes are coaxial. The protruding upper edge of the hole in the washer 112 is rounded slightly for reasons which will be explained presently. The lower end of the housing 103 of the aspirating mechanism 100 is positioned coaxially in the opening 110 and spaced from the throat 115 by a plurality of legs 120 extending from the lower surface thereof. The housing 103 and the throat 115 may consist of a plastic material for simplicity of construction and resistance to corrosion. The legs 120 and the housing 103 are fixedly attached to the throat 115 by some means such as a chemical bond or the like. Thus, the legs 120 hold the throat 115 fixedly in place while correctly spacing the housing 103 therefrom. The lower surface of the housing 103 and the upper surface of the washer 112 define a chamber 116. The chamber 116 contains the throat 115 approximately centrally located therein and the brine line 104 is in communication therewith.

An O-ring 121 is positioned between the outer surface of the housing 103 and the inner surface of the opening 110 to prevent the passage of fluid therebetween. The housing 103 forms an upper chamber 122 which is in communication with the chamber 32 in housing 15 by means of a plurality of holes 123 in the housing 103. The lower end of the body 103 has a hole 124 therein which is coaxial with the hole in the throat 115 but somewhat smaller in diameter.

A movable core 125 is positioned in the housing 103 approximately coaxially with the hole 124. A view in perspective of the core 125 is illustrated in FIG. 3. The core 125 is an elongated substantially cylindrical body having means at one end for attachment to the core of the solenoid 101. In the present embodiment this means for attachment is a threaded portion at the upper end of the core 125 which engages the core of the solenoid 101. The lower end of the core 125 has a portion 126 with a substantially reduced diameter and a plurality of fins 127 extending radially outwardly therefrom. Adjacent the upper end of the fins 127 a shoulder 128 extends radially outwardly a short distance farther and acts as a stop which butts against the housing 103 at the edges of the hole 124 and centers the core 125 while preventing it from passing into the hole 124 too far. The extreme lower end of the core 125 is gradually reduced in diameter in a somewhat conical shape and the fins 127 are tapered inwardly to join the main body of the core 125 adjacent the end thereof in a manner similar to a fillet.

Thus, because of the conical end on core 125 it is substantially self-centering and as it moves into the hole 124 the fins 127 guide the core 125 into a substantially coaxial position. In the lowermost position the fins 127 of the core 125 fit tightly against the edges of the hole 124 so that a cross-section of the opening is reduced to a plurality of arcuate openings in a substantally annular form. When the solenoid 101 is energized the core 125 is moved vertically upward until the hole 124 is completely open and again has a substantially circular cross-section. The core 125 may be constructed of a plastic material similar to the housing 103, for simplicity of construction nd to prevent corrosion and the like.

In the operation of the present apparatus there are three cycles; the service or softening cycle, the regeneration cycle and the fast-rinse cycle. In the service or softening cycle the solenoid valve 91 is de-energized, whereby the drain is disconnected, and the aspirating mechanism 100, while not critical to this cycle, may be de-energized for conservation of power. Hard water enters the inlet 56 and fills the chamber 55 in the housing 15. The bib washer 61 is biased against the valve seat 37 by the spring 78 and, therefore, water flows from the chamber 55 into the chamber 65. The hard water flows thorugh the openings 86 and 87 in the shaft 60 thereby filling the chamber 85 but, since the drain is not open, the pressure in the chamber 85 and the chamber 65 are equal and, therefore, the diaphragm 76 has equal pressure on both sides and remains in a normal position. The hard water also flows from the chamber 65 through the passageway 64 to the chamber 19 at the bottom of the housing 15 where it enters the mineral tank 10. The hard water then filters down through the mineral bed 11 to the lower end of the riser pipe 24. As soft water is drawn out of the housing 15 at the outlet 40, the soft water rises in the riser pipe 24 and passes through the holes 31 into the chamber 30 where it forces the valve element 49 upwardly and enters the chamber 32 thereafter passing through the outlet 40. Since the water pressure in the chamber 30 and the chamber 32 are equal, no water flows through the aspirating mechanism 100.

During the regeneration cycle the solenoid coil 93 is energized, thereby opening the drain and the solenoid 101 remains de-energized thereby maintaining its position of the core 125 into the opening 124 and reducing the cross-sectional area thereof. As the regeneration cycle starts the hard water flows from the inlet 56 into the chambers 55, 65 and 85. Since the hole 96 is aligned with the pipes 90 and 92, the hard water is free to flow into the drain from the chamber 85. However, as the hard water flows from the chamber 85 into the drain the hard water flowing from the chamber 65 to the chamber 85 through the restricted openings 87 and 86 in the core 60, causes a pressure differential to build up on the diaphragm 76. When the pressure of the water in the chamber 65 overcomes the bias of the spring 78, the diaphragm 76 is forced upwardly thereby moving shaft 60 upwardly and moving the bib washer 61 from the valve seat 37 to the valve seat 68. This closes the passage of hard water from the chamber 55 to the chamber 65 but opens a passage for the hard water from the chamber 55 to the chamber 32. The hard water in the chamber 32 is free to flow out through the soft-water outlet 40 in the event water is required during the regeneration cycle.

The hard water in the chamber 32 also enters the chamber 122 in the housing 103 of the aspirator mechanism 100, where it is forced downwardly through the opening 124 into the throat 115. Since the core 125 is in the lower position, the hole 124 has a somewhat annular cross-section which is broken into a plurality of arcuate sections. Thus, the hard water in the chamber 122 is forced through the restricted opening 124 into the throat 115 in a plurality of high velocity jets. These high velocity jets of hard water entering the throat 115 produce a partial vacuum in the chamber 116 which draws brine into the chamber from the brine supply line 104. This brine is mixed with hard water in the throat 115 and passes through the opening in the washer 112 into the chamber 30. The brine solution in the chamber 30 then passes into the riser pipe 24 through the holes 31 and out into the mineral bed 11. As the brine solution passes upwardly through the mineral bed 11, it enters the chamber 19 and flows through the passageway 64 to the chamber 65. The brine solution flows from the chamber 65 through the restricted openings 87 and 86 in the shaft 60 into the chamber 85 and thence out to the drain.

Because the hard water passes through the restricted opening 124 in a plurality of high velocity streams a greater vacuum is produced in the chamber 116 with a smaller amount of hard water. In FIGS. 7 and 8 a different embodiment is illustrated in which a core 125' does not have the fins 127 at the lower end thereof. Thus, when this modified core 125' is in the lower position in the hole 124', a substantially tubular jet of water is produced by hard water flowing therethrough. Since the conical tip of the core 125' cannot touch the hole 124', it cannot be used to guide the vertical movement of the core 125'. In this embodiment fins 130 extend radially outwardly and cooperate with the body 103' to guide the core 125'. The body 103' has a shoulder 131 above the holes 123 which act as a stop to prevent the core 125' from passing too far into the hole 124'. Again this tubular jet of water produces a larger vacuum in the chamber 116' with a smaller amount of water. That is to say, the tubular jet of water produces a vacuum in the chamber 116' equal to the vacuum produced by a solid jet of water having the same diameter but less water is used with the tubular jet because of the substantially hollow center therein. The same reasoning is true for the plurality of arcuate streams produced by the embodiment of FIG. 4 and, in fact, it is believed that this embodiment will produce a slightly higher vacuum in the chamber 116 with even less water since the complete surface of each of the jets aids in producing the vacuum.

Figure 5:
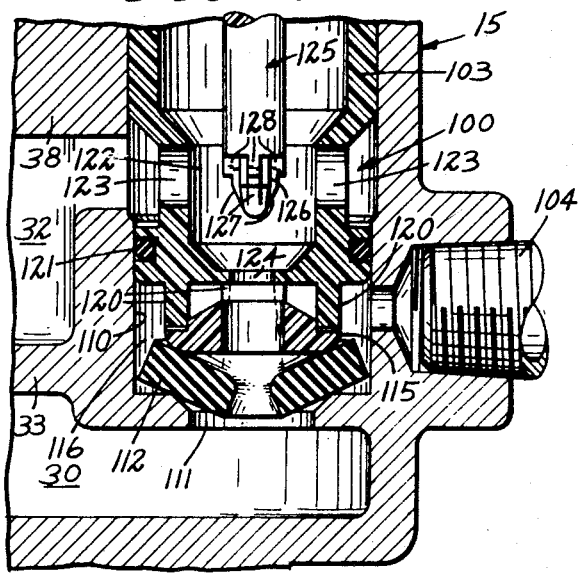
FIG. 5 is a view similar to FIG. 4 illustrating the parts thereof in a different position.
Figure 6:
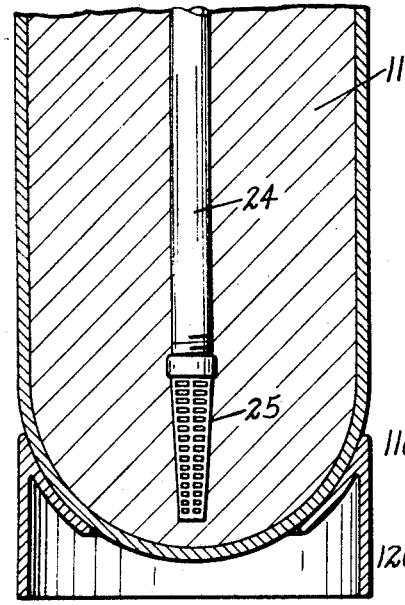
FIG. 6 is a sectional view as seen from the line 6—6 in FIG. 4.

In the fast-rinse cycle the solenoid valve 91 remains energized so that the drain is open and, therefore, the bib washer 61 remains in its upper position against the valve seat 68. The solenoid 101 is also energized so that the core 125 of the aspirating mechanism 100 is moved upwardly away from the hole 124. Thus, hard water enters the inlet 56 and passes through the chambers 55, 32 and 122. The hard water in chamber 122 is free to pass through the hole 124, which is unobstructed by the core 125, in a solid stream. Referring to FIG. 5, the water passing through the hole 124 strikes the slightly protruding inner edges of the washer 112 and causes the washer 112 to deform or bend slightly about the upper edges of the hole 111. As the washer 112 is forced slightly into the hole 111, the hole through the washer 112 is reduced somewhat in size thereby restricting the flow of hard water therethrough. Thus, washer 112 acts as a flow control means which restricts the flow of hard water automatically. It should be understood that other means of automatically restricting the flow might be used but this method is explained because of its simplicity and efficiency. The restriction of the water flowing through the hole in the washer 112 causes a pressure in the chamber 116 thereby preventing the flow of any brine into the chamber 116 from the inlet 104. This pressure in the brine line 104 is sufficient to refill the brine supply with hard water which is converted to brine for the next cycle. Thus, only hard water enters the chamber 30 and flows into the riser pipe 24 through the hole 31. This pure hard water flushes the brine from the mineral bed 11 and expands the mineral bed 11 as previously explained. Since the drain is still open, this water flows into chamber 19, through passageway 64 to chamber 65, through the restricted openings 87 and 86 into the chamber 85 and thence out to the drain. When the fast-rinse cycle is completed, the solenoid coils 93 and 101 are de-energized thereby closing the drain and removing power from the aspirating mechanism after which the bib washer 61 is returned to its normal position and soft water again flows through the outlet 40.

Thus, the present apparatus has the advantages of simplicity of construction and operating, as well as a reduction in cost. Further, the present aspirating mechanism is a great improvement over the prior art since a higher vacuum is produced with a smaller amount of hard water, after which the core 125, hole 124 and throat 115 are automatically cleaned by the fast-rinse cycle. Therefore, the present apparatus is self-cleaning as well as having an increased efficiency.

While we have shown and described the specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. An aspirator for water softeners and the like comprising:
    (a) wall structure defining a chamber having an inlet and an outlet for conducting a flow of fluid therethrough;
    (b) a core having an imperforate tip formed to be inserted within said chamber inlet in a restricting position for restricting said chamber inlet to an opening with a cross section having a generally annular configuration;
    (c) transversely outwardly projecting shoulder means affixed to said core in a spaced relation from said core tip;
    (d) stop means fixedly mounted relative to said wall structure and positioned to engage said shoulder means with said core tip in the restricting position and for preventing further insertion of said core tip into said chamber inlet;
    (e) power operated actuating means adjacent said wall structure mounting said core exterior of said chamber, said actuating means, upon proper energization thereof, moving said core between the restricting position in which said shoulder means are engaged with said stop means so that fluid flowing through said chamber inlet forms an aspirating stream directed toward said outlet in said generally annular configuration to produce a partial vacuum in said chamber and a second position in which said chamber inlet is substantially unrestricted; and
    (f) a fluid passageway attached to said wall structure in communication with said chamber and subject to the partial vacuum in said chamber during fluid flow from said chamber inlet to said chamber outlet with said core in the restricting position.

2. An aspirator for water softeners and the like as set forth in claim 1 wherein said shoulder means include portions which slidably engage portions of the wall structure to guide said core tip into the restricting position.

3. An aspirator for water softeners and the like comprising:
    (a) wall structure defining a chamber having an inlet and an outlet for conducting a flow of fluid therethrough;
    (b) a core formed to be inserted within said chamber inlet in a restricting position for restricting said chamber inlet to an opening with a cross section having a generally annular configuration;
    (c) power operated actuating means adjacent said wall structure mounting said core exterior of said chamber, said actuating means, upon proper energization thereof, moving said core between a first position in which said core is inserted within said chamber inlet in the restricting position and fluid flowing through said chamber inlet forms an aspirating stream directed toward said outlet in said generally annular configuration to produce a partial vacuum in said chamber and a second position in which said chamber inlet is substantially unrestricted;
    (d) said core including a member having a radially inwardly tapering, generally conically shaped portion positioned adjacent the chamber inlet for insertion of the tapered portion therein in the first position of said core, said member having attached thereto outwardly projecting, guide acting stop members engaging said wall structure to guide said core during movements thereof and abutting a shoulder fixed relative to the wall structure when said core is moved into the first position to prevent said core from moving into a further restricting position relative to the chamber inlet; and
    (e) a fluid passageway attached to said wall structure in communication with said chamber and subject to the partial vacuum in said chamber during fluid flow from said chamber inlet to said chamber outlet with said core in the restricting position.

4. An aspirator for water softeners and the like comprising:
    (a) wall structure defining a chamber having an inlet and an outlet for conducting a flow of fluid therethrough;
    (b) a core formed to be inserted within said chamber inlet in a restricting position for restricting said chamber inlet to an opening with a cross section having a generally annular configuration;
    (c) power operated actuating means adjacent said wall structure mounting said core exterior of said chamber, said actuating means, upon proper energization thereof, moving said core between a first position in which said core is inserted within said chamber inlet in the restricting position and fluid flowing through said chamber inlet forms an aspirating stream directed toward said outlet in said generally annular configuration to produce a partial vacuum in said chamber and a second position in which said chamber inlet is substantially unrestricted;

(d) said core including a member having a radially inwardly tapering generally conically shaped portion positioned adjacent the chamber inlet for insertion of the conically shaped portion therein in the first position of said core, said member having a plurality of radially outwardly projecting portions spaced apart about the periphery thereof adjacent said conically shaped portion for abutting said wall structure adjacent the chamber inlet when said core is moved into said restricting position and restricting said chamber inlet to a plurality of arcuate openings; and (e) a fluid passageway attached to said wall structure in communication with said chamber and subject to the partial vacuum in said chamber during fluid flow from said chamber inlet to said chamber outlet with said core in the restricting position.

References Cited

UNITED STATES PATENTS

| | | | |
|---|---|---|---|
| 2,327,637 | 8/1943 | Harris | 103—272 X |
| 2,352,094 | 6/1944 | Griswold | 103—272 |
| 2,880,872 | 4/1959 | Albertson | 210—191 X |
| 2,987,007 | 6/1961 | Conkling | 103—271 |
| 2,999,514 | 9/1961 | Kryzer. | |
| 3,110,320 | 11/1963 | Rosenberger. | |
| 3,139,041 | 6/1964 | Techler | 103—272 |
| 3,215,273 | 11/1965 | Kryzer. | |
| 3,225,789 | 12/1965 | Thompson. | |
| 3,225,790 | 12/1965 | Laughlin. | |

REUBEN FRIEDMAN, Primary Examiner

C. M. DITLOW, Assistant Examiner

U.S. Cl. X.R.

210—191